United States Patent [19]
De Graaf et al.

[11] Patent Number: 6,105,648
[45] Date of Patent: Aug. 22, 2000

[54] PRESSURE ROLL FOR A TIRE BUILDING APPARATUS

[75] Inventors: Martin De Graaf, Emst; Pieter Wubbo De Vries, Hoogeveen, both of Netherlands

[73] Assignee: VMI EPE Holland B.V., Gelriaweg, Netherlands

[21] Appl. No.: 09/050,453

[22] Filed: Mar. 30, 1998

Related U.S. Application Data

[63] Continuation of application No. PCT/NL96/00419, Oct. 25, 1996.

[51] Int. Cl.⁷ .............................. B29D 30/28; F16C 13/00
[52] U.S. Cl. ............................................. 156/421; 156/412
[58] Field of Search ................................... 156/408, 421, 156/412, 360, 582, 574; 492/7, 40; 144/250.1

[56] References Cited

U.S. PATENT DOCUMENTS

| | | | |
|---|---|---|---|
| 492,072 | 2/1893 | Vaught | 492/40 |
| 715,041 | 12/1902 | Ensign | 144/250.1 |
| 1,527,175 | 2/1925 | Desautels | 156/421 |
| 1,834,559 | 12/1931 | Waner . | |
| 4,052,246 | 10/1977 | Albareda et al. | 156/412 |
| 4,535,230 | 8/1985 | Brieu | 219/470 |
| 5,257,965 | 11/1993 | Fuchs et al. | 492/40 |
| 5,330,609 | 7/1994 | Dreyer et al. | 156/421 |
| 5,454,897 | 10/1995 | Vaniglia | 156/166 |

FOREIGN PATENT DOCUMENTS

| | | |
|---|---|---|
| 2539122 | 7/1984 | France . |
| 2753272 | 5/1979 | Germany . |
| 4220490 | 1/1994 | Germany . |

*Primary Examiner*—Geoffrey L. Knable
*Attorney, Agent, or Firm*—Ladas & Parry

[57] ABSTRACT

Pressure roll for a tire building apparatus for preparing pneumatic tire blanks with a building drum for receiving tire layers. The pressure roll cooperates with the building drum has a plurality of discs mutually slidable with respect to one another and on a shaft so as to extend radially with respect to the building drum, the discs being mutually uniformly shaped, and each disc having an interior part and an exterior ring surrounding the interior part and being rotatable about a ball bearing, the interior part having a recess whose sidewalls slide radially on the sidewalls of the shaft and whose length is greater than the corresponding size of the shaft. The shaft extends in the longitudinal direction of the pressure roll. The shaft is provided with a number of radially directed bores equal to the plurality of discs, and in each bore a piston is disposed that engages the interior part of the respective disc concerned. The shaft is provided with pressure medium channels for feeding a pressure medium to a bore.

11 Claims, 4 Drawing Sheets

PRESSURE ROLL FOR A TIRE BUILDING APPARATUS

"This is a continuation of copending International Application Number PCT/NL96/00419 filed on Oct. 25, 1996, claims the benefit thereof and incorporates the same by reference."

FIELD OF THE INVENTION

The invention relates to a tire building apparatus for preparing pneumatic tire blanks with a building drum for receiving tire layers and a pressure roll cooperable therewith, having a plurality of discs mutually slidable with respect to one another and on an shaft extending radially with respect to the building drum, the shaft extending in the longitudinal direction of the pressure roll, the discs being mutually uniformly shaped, and each disc having an interior part and an exterior ring surrounding the latter and being rotatable about a ball bearing, the interior part having a recess with whose sidewalls it slides radial relative to the building drum on the sidewalls of the shaft and whose length is a stroke length larger than the corresponding size of the shaft.

BACKGROUND AND PRIOR ART

Such a tire building apparatus is described in DE 42 20 490 A1. In this known tire building apparatus one piston tube, which extends over the length of the pressure roll and is chargeable with a pressure means, is arranged in the space between the shaft and the recess, thus in the head stroke space and the foot stroke space. Using piston tubes has disadvantages, however. It is possible, for example, that after repeated charging of the piston tubes, the elasticity of the piston tubes decreases or that holes develop in the piston tubes, so that the action of the pressure roll is adversely affected and the piston tubes have to be constantly replaced. In addition, it is very difficult to control each disc separately and although this possibility is mentioned in DE 42 20 490 A1, no further embodiment thereof is described.

SUMMARY OF THE INVENTION

The object of the present invention as is to provide a tire building apparatus with a long, service-free period of action in which each disc can be separately controlled with great accuracy.

Thus, with a tire building apparatus of the above type it is proposed, that the shaft is provided with a number of radially directed bores equal to the plurality of discs, and that in each bore a piston is disposed that engages the interior part of the respective disc, and that the shaft is provided with pressure medium channels for feeding a pressure medium to a bore.

An embodiment of a tire building apparatus according to the invention is characterized in that the shaft has two shaft parts, each shaft part extending in longitudinal direction of the pressure roll, one of the two shaft parts being provided with a number of radially directed bores equal to the plurality of discs, in that in each bore a piston is arranged that engages the interior part of the respective disc, and in that the shaft is provided with pressure medium channels for feeding a pressure medium to a bore. Because the sliding of each disc takes place by means of one single, corresponding piston, this sliding can be accurately controlled. Moreover, these pistons have a longer lifespan than piston tubes.

Depending on the number of pressure medium channels, sliding the discs of the pressure roll per disc or per group of discs can be realized.

In order to prevent the exterior rings of the discs from sticking to the tire components while rolling the tire components against tire layers that are arranged on the building drum, the exterior rings are made of a material that does not stick to rubber, for instance Teflon or a metal with an exterior surface that does not stick to rubber, for instance anodically oxidized aluminum.

For ease of flexibility of the interior parts of the discs against each other, the interior parts are expediently made of a substance with good sliding characteristics, for instance a suitable, dimensionally stable plastic. Thus, in an advantageous manner, the shaft is made of a substance with good sliding characteristics, such as aluminum, for example, the surface of which is anodically oxidized or treated in another way, with a view to ease of flexibility towards the interior parts.

It is advantageous, especially for pressing a tread on the belt, if each exterior ring has a rounded peripheral surface, whereby a rolling can take place that is as complete as possible and no undesired marks from the discs remain behind on the circumferential grooves on the tread.

BRIEF DESCRIPTION OF DRAWING

An exemplary embodiment of a pressure roll for a tire building apparatus according to the invention is shown in the drawing, in which.

DETAILED DESCRIPTION

Figure 1:
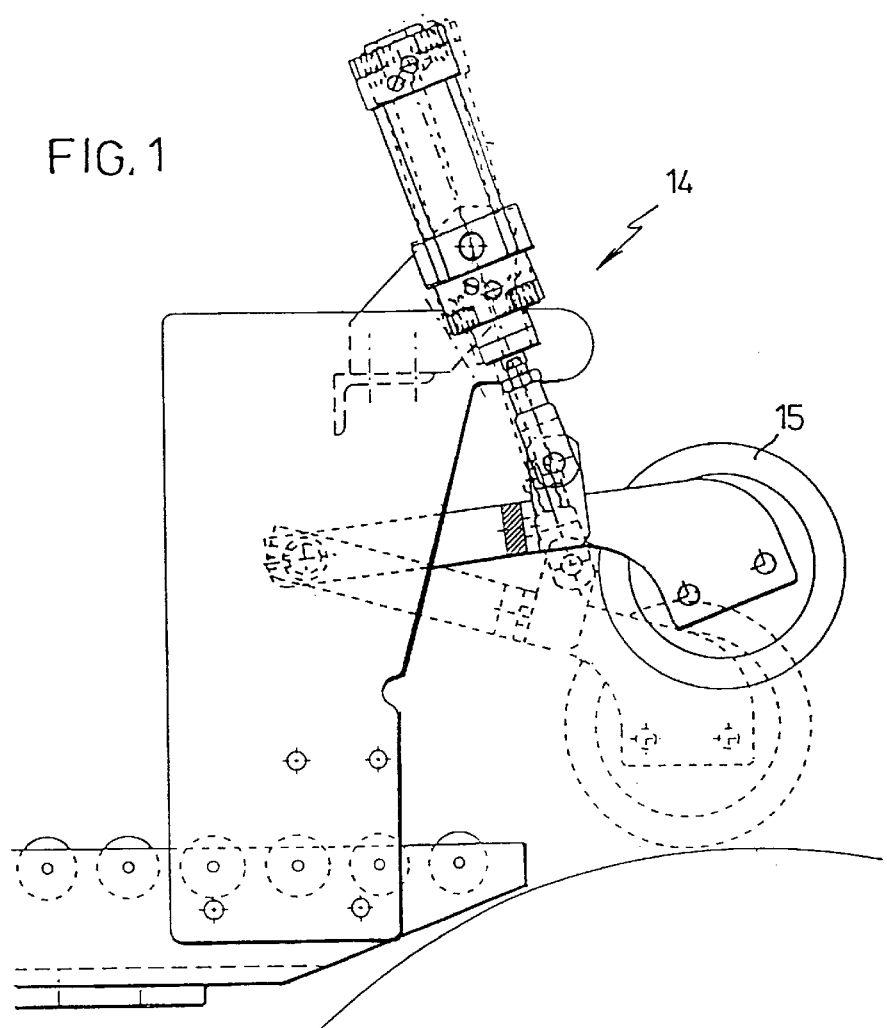
FIG. 1 shows a schematic view of a pressure roll mounted on a fixture.
Figure 2:
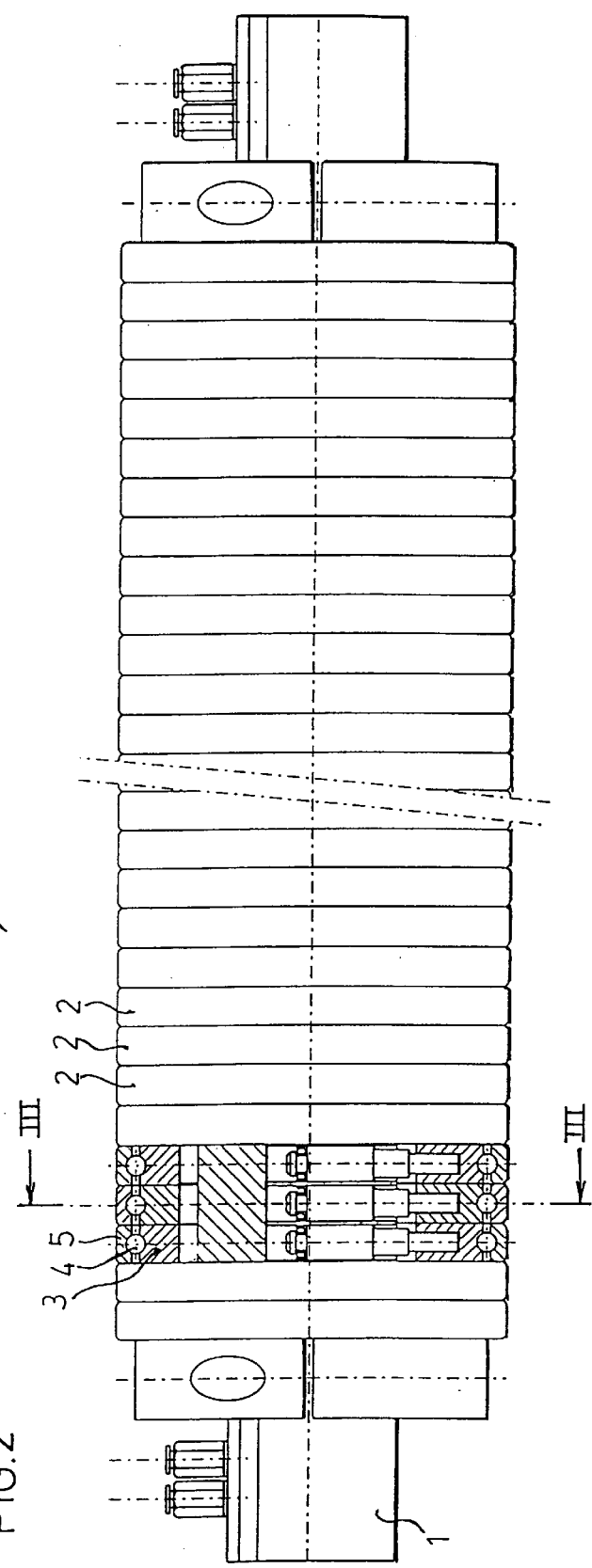
FIG. 2 shows a schematic view, in part in cross section, of an embodiment of a pressure roll according to the invention.
Figure 4:
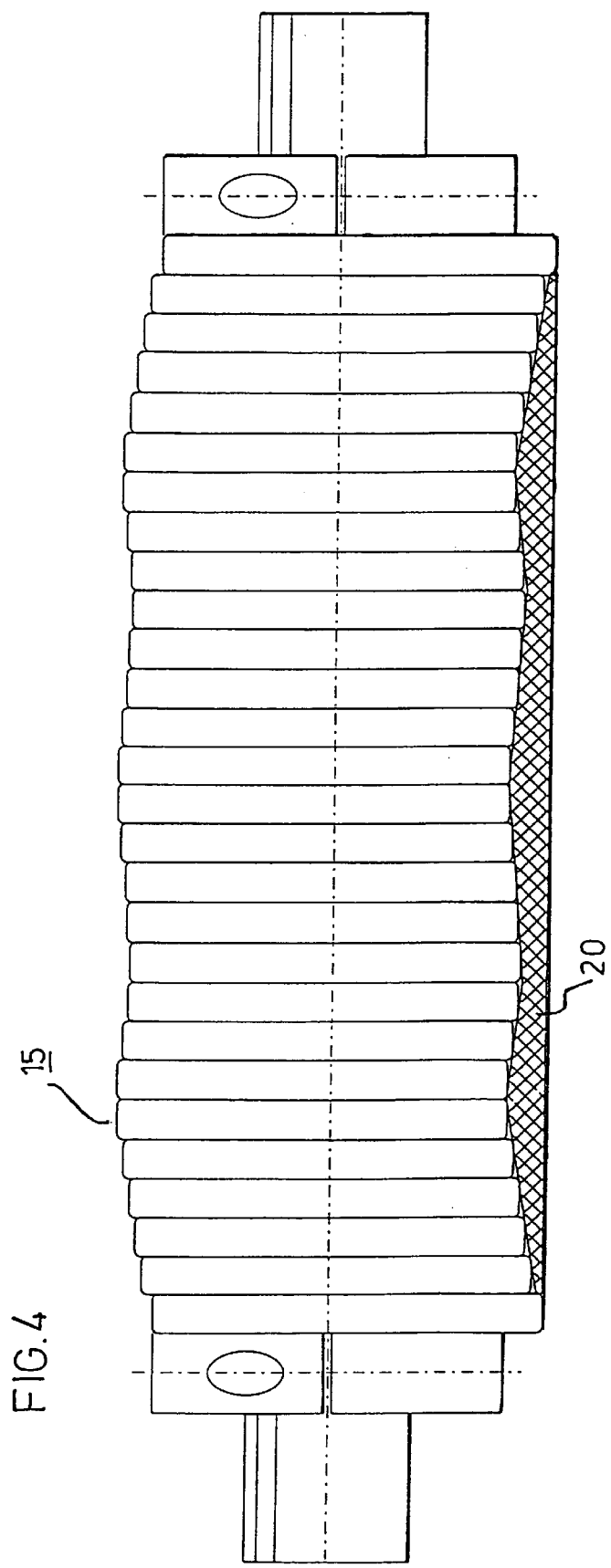
FIG. 4 shows a schematic view of the pressure roll according to FIG. 2, the pressure roll pressing on a tread.

A shaft 1 (FIG. 2) with an approximately square cross section rests unrotatably in a movable fixture 14 for a pressure roll 15 (FIG. 1) of an otherwise not shown tire building apparatus. With the help of the fixture or its drive, respectively, the pressure roll can be radially placed with regard to the building drum of the tire building apparatus. The fixture 14 shown in FIG. 1 is an example of fixtures that can be used for mounting the pressure roll and for moving the pressure roll towards a building drum. It is obvious that several types sorts of fixtures can be used.

Figure 3:
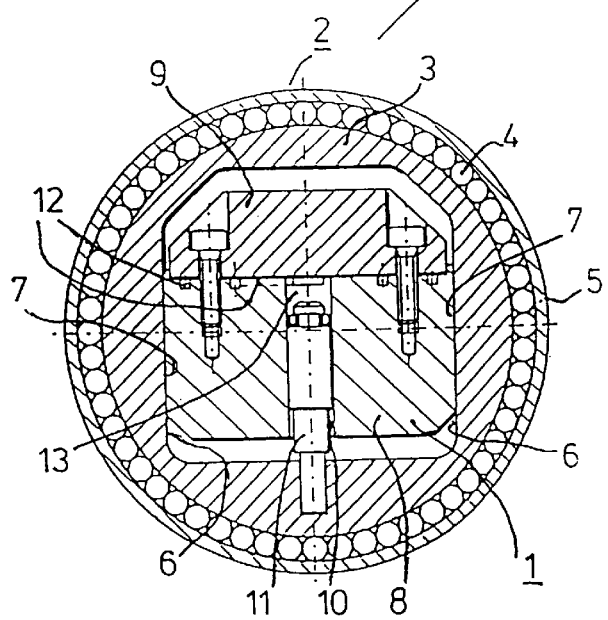
FIG. 3 a cross section of the pressure roll of FIG. 2 along the line III—III.

Along its effective working length a plurality of mutually equal discs 2 is also unrotatably arranged on the shaft 1 of the pressure roll in a manner which is radially slidable but relative to the building drum. Each disc has an interior part 3 and an exterior part 5 surrounding the latter about a ball bearing 4. The interior part 3 is provided with a rectangular recess, with sidewalls 6 slide on the sidewalls 7 of the shaft 1 (FIG. 3).

In this embodiment the shaft has two shaft parts 8, 9 each extending in the longitudinal direction the the pressure roll. One shaft part 8 is provided with a number of radially directed bores 10 equal to the plurality of discs. A piston 11 that engages the internal part 3 of the relative disc 2 in question is disposed in each bore 10.

Figure 5:
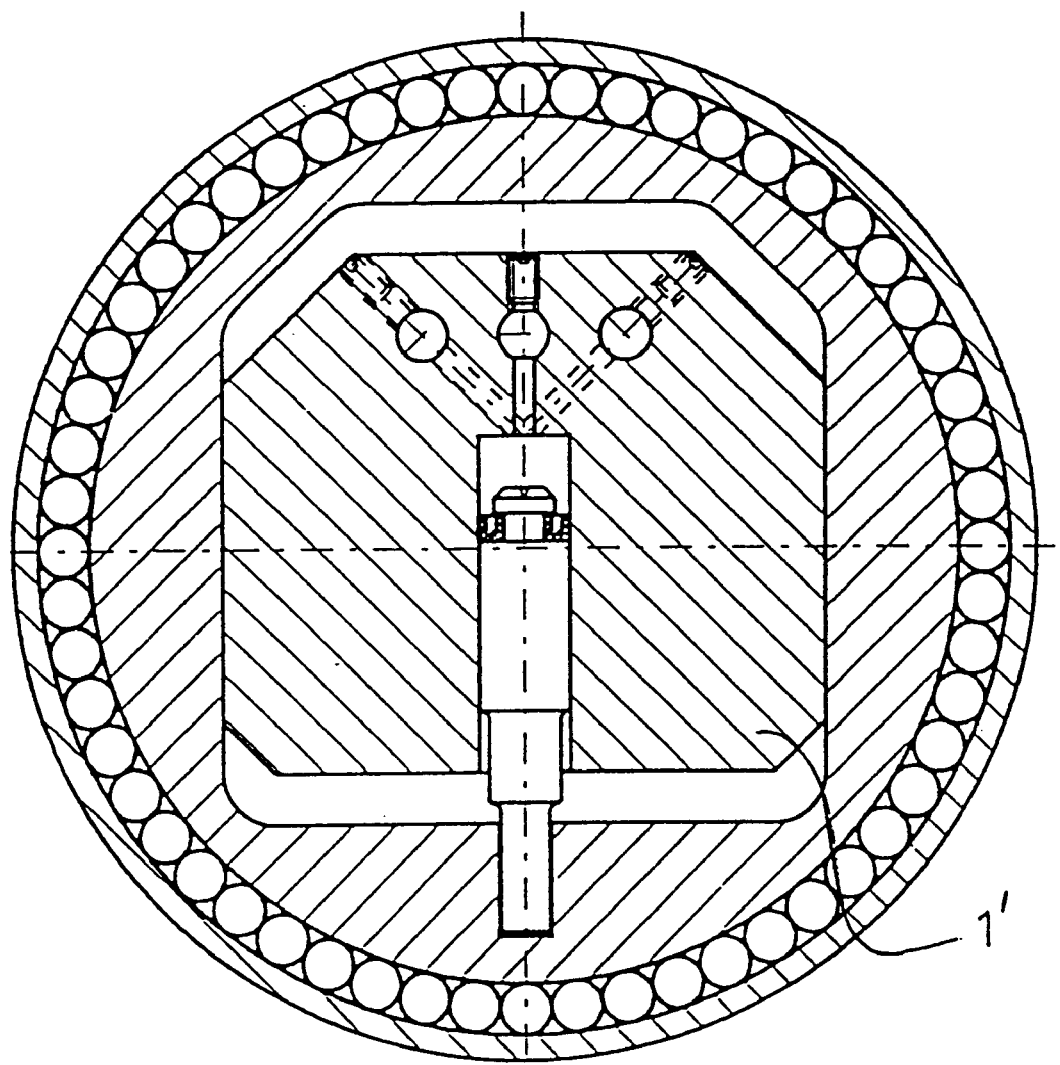
FIG. 5 shows a cross section of a pressure roll according to the invention with a one-piece shaft.

In an alternative embodiment of the invention the shaft 1' can be made in one-piece, as shown in FIG. 5.

The shaft 1 is further provided with pressure medium channels 12 for feeding a pressure medium, for instance air, to operate respective the piston 11 if the stroke space 13 is charged. The pressure medium channels 12 are, for example, realized between the two shaft parts 8, 9 and are preferably provided in one shaft part 8 only.

Depending on whether each disc 2 is controlled separately or a group of discs is controlled in the pressure roll, the number of pressure medium channels 12 is equal to or less than the number of bores 10, respectively.

For easy slidability of the interior parts 3 against each other and against the shaft 1, the interior parts 3 are made of a material presenting a particularly slidable surface, such as a dimensionally stable plastic with low friction, and the shaft is made of a metal, preferably aluminum, the surfaces of the shaft, especially the sidewalls, being treated, for instance anodically oxidized, so as to present good sliding characteristics.

Effectively, the exterior rings 5 consist of a substance with anti-adhering characteristics regarding the tire building components, for instance Teflon or metal with an exterior surface not sticking to rubber.

When a tread strip with profile has to be rolled by the pressure roll against a carcass arranged on a building drum, the exterior rings preferably have rounded edges in order to achieve rolling without leaving undesired marks in the tread.

What is claimed is:

1. A tire building apparatus for preparing pneumatic tire blanks in which tire layers are received on a building drum, said apparatus comprising a pressure roll for cooperating with the building drum to apply pressure to the tire layers thereon, said pressure roll including a non-rotatable shaft extending in a longitudinal direction of the pressure roll, a plurality of uniformly shaped radial discs on said shaft, each disc including an interior part individually slidably supported on said shaft for movement radially relative to said building drum and an exterior ring surrounding said interior part and rotatably supported on said interior part, said interior part having a recess whose length is greater than the corresponding size of the shaft, the recess having sidewalls slidably engaged on sidewalls of said shaft for movement in a radial direction relative to the building drum, said shaft having a plurality of radial bores, one for each disc, a piston secured in said interior part of each disc and slidably engaged in a respective one of said radial bores in the shaft, said shaft having channels connected to respective bores to supply pressure medium thereto such that each disc is radially movable on said shaft under the guidance and control of the respective piston in its respective bore in the shaft.

2. Tire building apparatus according to claim 1 wherein the number of pressure medium channels is equal to the number of bores.

3. Tire building apparatus according to claim 1 the number off pressure medium channels is less than the number of bores.

4. Tire building apparatus according to claim 1, wherein said shaft comprises two adjacent shaft parts.

5. Tire building apparatus according to claim 4, wherein the pressure medium channels are provided in one of the shaft parts.

6. Tire building apparatus according to claim 1, wherein the exterior ring of each disc is made of a plastic with an exterior surface that does not stick to rubber.

7. Tire building apparatus according to claim 1, wherein the exterior ring of each disc is made of metal with an exterior surface that does not stick to rubber.

8. Tire building apparatus according to claim 1, wherein the interior part of each disc is made of dimensionally stable plastic with low friction.

9. Tire building apparatus according to claim 1, wherein the shaft is made of a material with good sliding characteristics, and sidewalls of the shaft are treated so as to present good sliding characteristics.

10. Tire building apparatus according to claim 1, wherein each exterior ring has a rounded peripheral surface.

11. Tire building apparatus according to claim 5, wherein said bores are provided in said one of said shaft parts.

* * * * *